Sept. 13, 1960 D. J. RUSSELL ET AL 2,952,818

ASTABLE MULTIVIBRATOR

Filed Jan. 29, 1959

INVENTORS.
DUANE J. RUSSELL
CYRIL D. HANSEN
BY
J. M. St. Amand
ATTORNEYS.

United States Patent Office 2,952,818

Patented Sept. 13, 1960

2,952,818

ASTABLE MULTIVIBRATOR

Duane J. Russell and Cyril D. Hansen, China Lake, Calif., assignors to the United States of America as represented by the Secretary of the Navy Filed Jan. 29, 1959, Ser. No. 790,026

7 Claims. (Cl. 331—113)

(Granted under Title 35, U.S. Code (1952), sec. 266)

The invention herein described may be manufactured and used by or for the Government of the United States of America for governmental purposes without the payment of any royalties thereon or therefor.

The present invention relates to astable multivibrators and more particularly to astable multivibrators using the controlled rectifier.

Previously vacuum tubes, transistors, or thyratrons were used in some of the many prior type astable multivibrator circuits. However, in such circuits, vacuum tubes have been somewhat inefficient because of their requirement for filament current; thyratrons, although they can conduct large amounts of current, have the disadvantage of being large compared to semiconductor devices; and transistors that have current carrying capabilities comparable to the controlled rectifier require larger amounts of controlling current than does the controlled rectifier. The astable multivibrator of the present invention using the controlled rectifier makes it possible to switch large quantities of power between loads at regular intervals by a relatively small amount of control current.

It is an object of the present invention, therefore, to provide a new and improved multivibrator.

Another object is to provide a multivibrator using a controlled rectifier.

A further object of the invention is to provide a new and improved astable multivibrator for controlling large amounts of current with a relatively small amount of control current.

A still further object is to provide a new astable multivibrator using a PNPN semiconductor device having two stable states.

Other objects and many of the attendant advantages of this invention will become readily appreciated as the same becomes better understood by reference to the following detailed description when considered in connection with the accompanying drawings wherein.

Referring now to the drawings like numerals refer to like parts in each of the figures.

The controlled rectifier is a semiconductor device possessing electrical characteristics that were previously unobtainable in semiconductor devices. It is composed of alternate layers of P- and N-type semiconductor material resulting in a four-layer, three-terminal device. The three terminals of the controlled rectifier are called the collector, emitter and base and are frequently referred to as the anode, cathode, and gate, respectively.

Electrically, the controlled rectifier is bi-stable. The two stable states are (1) a high-resistance state, and (2) a low-resistance state. When the controlled rectifier is "off" or nonconducting it has very high resistance and is in the high-resistance state; when it is "on," or conducting, it has very low resistance and is in the low-resistance state. The low-resistance state can be brought about by applying a high enough voltage from the cathode to the emitter, or by injecting a current of the proper magnitude into the base while the controlled rectifier is forward biased. In other words, it can be turned "on" by exceeding a breakdown voltage, or by supplying a small amount of current (about 10 ma., for example) to the base lead. Once the controlled rectifier is in the low-resistance state ("on" or conducting), the base no longer has control of the cathode-to-emitter current flow through the rectifier, in other words, the base can neither stop nor control the magnitude of the current flow. The high-resistance state is restored by reducing the cathode-to-emitter current to a particular level, i.e., by dropping the voltage across the rectifier to below some critical value. The controlled rectifier then must be turned on by one of the two methods described above. It should be noted that the electrical properties of the controlled rectifier are very similar to those of an ordinary thyratron, the major difference being, that the thyratron is voltage-actuated and the controlled rectifier is current-actuated.

Figure 1:
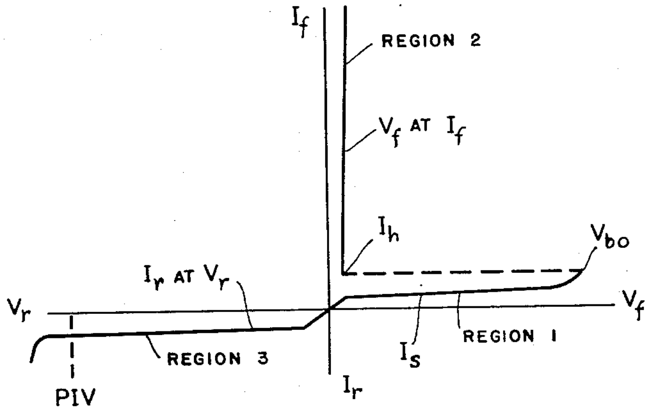
Fig. 1 is a curve showing the cathode-to-emitter conduction characteristics of the controlled rectifier with zero gate current.

The collector-to-emitter conduction characteristics with zero base current are shown in the curve of Fig. 1. The three regions shown in the figure are: Region 1 (the high-resistance region); Region 2 (the low-resistance region); and Region 3 (the back-bias region). The symbols in Fig. 1 represent the following: $I_s$ (forward saturation current); $I_h$ (holding current); $V_f$ (average forward voltage); $I_r$ (reverse current); $V_r$ (reverse voltage); $V_{bo}$ (forward breakover voltage); PIV (peak inverse voltage); and $I_f$ (average forward current).

If the controlled rectifier is operating anywhere in Region 1, it can be put into Region 2 by inserting the proper amount of base current. The forward breakover voltage, $V_{bo}$, is the voltage necessary to go from Region 1 to Region 2 with zero base current. The different types of controlled rectifiers are identified by specifying this voltage, $V_{bo}$. The operating temperature is from about −65° C. to 125° C.

Figure 2:
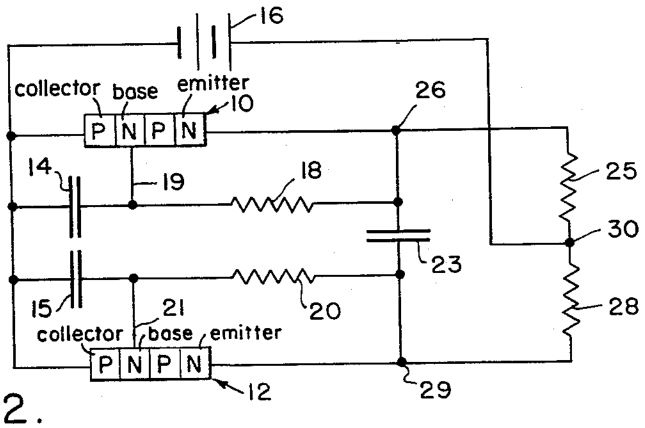
Fig. 2 is a circuit diagram of a preferred embodiment of the astable multivibrator of the present invention.

The circuit diagram of the preferred embodiment of the astable multivibrator is shown in Fig. 2. The emitters of controlled rectifiers 10 and 12, and one side of each of capacitors 14 and 15 are connected as shown to the negative (−) side of power source 16. The other side of capacitor 14 is connected to one end of charging resistor 18 and to the base lead 19 of controlled rectifier 10. The other side of capacitor 15 is connected to one end of charging resistor 20 and to the base lead 21 of controlled rectifier 12. The other end of charging resistor 18, the collector of controlled rectifier 10 and one side of capacitor 23 are each connected to one end of load resistor 25 at point 26. The other end of charging resistor 20, the collector of controlled rectifier 12 and the other side of capacitor 23 are each connected to one end of load resistor 28 at point 29. The other ends of load resistors 25 and 28 are connected together at 30 and connected to the positive (+) side of power source 16.

If controlled rectifier 10 is conducting, its forward resistance will be small; therefore, nearly the full voltage from source 16 will be across load resistor 25. Point 26, in this case, will be near ground potential resulting in zero current being supplied to the base 19 of controlled rectifier 10 through resistor 18. Controlled rectifier 12, being in the nonconducting state, will have a high forward resistance. Point 29 will therefore be near the voltage of source 16. Capacitor 15 will charge through resistor 20 until there is sufficient energy in capacitor 15 to actuate base 21 of controlled rectifier 12. Capacitor 15 will then discharge through base 21 and controlled rectifier 12 will be turned on resulting in a large voltage drop at point 29. This voltage drop is applied to point 26 through capacitor 23, dropping point 26 below ground potential thus turning controlled rectifier 10 off. Capacitor 14 will then charge through resistor 18 when point 26 returns to a positive voltage until controlled rectifier 10 is turned on and controlled rectifier 12 off. The process then repeats itself. The frequency of oscillation is determined by capacitors 14, 15 and 23, and resistors 18 and 20. In general, capacitor 14 would equal capacitor 15, and resistor 18 would equal resistor 20.

Figure 3:
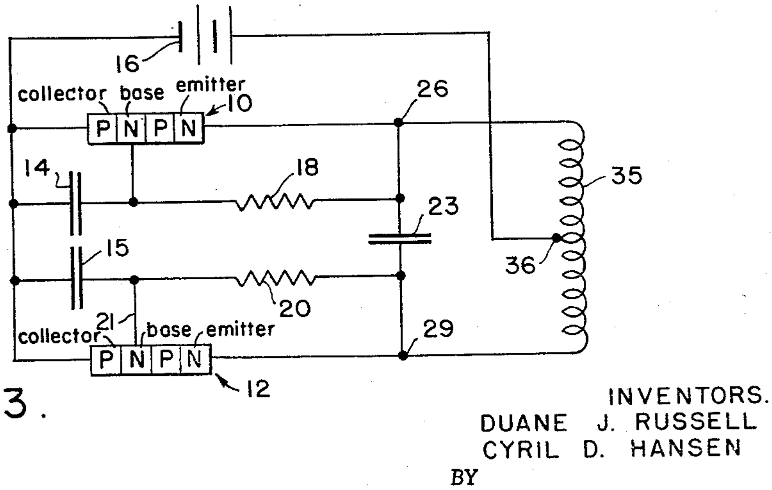
Fig. 3 is a circuit diagram of an astable multivibrator of the present invention having inductive loads and used for a D.-C. voltage converter.

In many applications it is necessary to use D.-C. voltage converters to obtain voltages that are not conveniently available for the particular application. The controlled rectifier offers a method of obtaining a high efficiency, small size D.-C. voltage converter capable of handling large amounts of power. This may be done by replacing load resistors 25 and 28 with a center tap winding 35 of a transformer, where the center tap 36 would be connected to the positive (+) terminal of voltage source 16. The turns ratio of the transformer would determine the voltage available from the secondary winding. This D.-C. voltage converter, which is essentially an astable multivibrator with inductive loads, is shown in Fig. 3. If controlled rectifier 10 is conducting, the potential at point 26 is low and there will be no appreciable current entering base 19 thereof; controlled rectifier 12 will be off and the potential at point 29 will be near the voltage of source 16. Resistor 20 is small enough so that the current is being supplied to capacitor 15 at a faster rate than it can drain off through base 21 of controlled rectifier 12. After a particular time interval the voltage on capacitor 15 builds up to a point where base 21 is supplied with the necessary current to fire controlled rectifier 12. There will be a large voltage drop at point 29 which will be applied to point 26 through capacitor 23, thus turning controlled rectifier 10 off. After a time interval determined by capacitor 14 and resistor 18, controlled rectifier 10 is turned on again and controlled rectifier 12 is turned off. The process then repeats itself. The waveshape is determined by the values of resistors 18 and 20, and capacitors 14 and 15.

The forward resistance of the controlled rectifiers is very low while in the conducting state and very high while in the non-conducting state. For this reason and the fact that very little base current is required to control a large amount of current through the loads, the astable multivibrator, described herein, using controlled rectifiers is a much more efficient circuit than heretofore obtained and is operable in a temperature range of from −65° C. to 125° C.

Obviously many modifications and variations of the present invention are possible in the light of the above teachings. It is therefore to be understood that within the scope of the appended claims the invention may be practiced otherwise than as specifically described.

What is claimed is:

1. An astable multivibrator comprising a D.-C. power supply; first and second PNPN semiconductor devices each having a collector, an emitter and a base, and two stable states, said stable states being a conducting state and a non-conducting state; first, second and third capacitors; first and second charging resistors, and first and second loads; the emitters of said first and second semiconductor devices and one side of said first and second capacitors each being connected to the negative side of said D.-C. power supply; the other side of said first capacitor being connected to the base of said first semiconductor device and to one end of said first charging resistor, the other side of said second capacitor being connected to the base of said second semiconductor device and to one end of said second charging resistor; the collector of said first semiconductor and the other end of said first charging resistor being connected to one side of said third capacitor and to one side of said first load, the collector of said second semiconductor and the other end of said second charging resistor being connected to the other side of said third capacitor and to one side of said second load, the other side of said first and second loads each being connected together and to the positive side of said D.-C. power supply; the forward resistance of the semiconductor being very low while in the conducting state and very high while in the non-conducting state, thus very little base current being required to control a large amount of current through the loads.

2. A circuit as in claim 1 wherein the frequency of oscillation of the multivibrator is determined by said first, second and third capacitors and said first and second charging resistors.

3. A circuit as in claim 1 wherein said first and second loads are resistance loads.

4. A circuit as in claim 1 wherein said first and second loads are inductive loads.

5. A circuit as in claim 4 wherein said inductive loads are one center tapped transformer winding having the center tap connected to the positive side of said power supply.

6. A circuit as in claim 1 wherein said first and second capacitors are of equal capacitance.

7. A circuit as in claim 1 wherein said first and second charging resistors are of equal resistance.

No references cited.